Patented July 4, 1950

2,514,286

UNITED STATES PATENT OFFICE 2,514,286

LUBRICATING GREASE AND METHOD OF PREPARING SAME

Arnold J. Morway, Clark Township, Union County, N. J., assignor to Standard Oil Development Company, a corporation of Delaware No Drawing. Application December 31, 1947, Serial No. 795,142

2 Claims. (Cl. 252—41)

The present invention relates to a self-thickening lubricating grease composition and more particularly to a lubricating composition which may normally be liquid, or at least semi-fluid, but which sets up to a solid grease structure having a definite penetration resistance on the application thereto of substantial working or shearing stresses.

In many applications where lubricating greases or other relatively thick lubricants are required, difficulty is encountered in placing the lubricant where it can function effectively as a lubricant. Solid lubricants which do not flow may fail to reach and protect metal surfaces against wear. On the other hand, liquid lubricants tend to flow away from lubricating position unless enclosed by liquid-tight housings. Such housings are not always practical.

The foregoing difficulties have been recognized in the prior art. Numerous suggestions have been made in the past for the use of a so-called "liquid" grease or a grease which will flow into positions where it is not easily possible to place a semi-solid or stiff grease composition. Thus, the prior art has suggested the lubrication of various elements in automotive equipment with lubricating oils containing small amounts of dissolved soaps. These soaps tend to thicken the oils somewhat, but unless used in true grease-forming proportions, they do not hold the lubricant in place where liquids are free to flow away. The use of small amounts of soap to increase oiliness and film strength, to decrease pour points and to reduce the tendency of oils in internal combustion engines to cause piston rings to stick and to form objectionable carbon deposits does not solve the problems stated above.

In still other cases, greases have been dissolved or dispersed in volatile solvents (naphtha, benzene, etc.). In these solutions the greases are fluid. After application, the volatile solvent evaporates and a solid grease is left in place. This is a partial solution to the problem but has some disadvantages. By this method a fire hazard is caused, and often the grease structure on removal of the non-lubricating solvent is unsatisfactory.

Lubricating grease compositions are commonly used to pack gear housings, to pack ball and roller bearings, to lubricate and also to seal open bearings against entrance of dirt and grit. In various ways solid lubricating greases provide an effective and durable lubricant in situations where a liquid lubricant is not satisfactory.

Solid greases depend for their lubricating effect upon the oil which they contain. They are solidified or rendered semi-solid merely for the purpose of preventing leakage or loss from the points to be lubricated and also for the purpose of resisting entrance of dust, dirt, water, and the like. These solid or semi-solid characteristics also enable them to adhere to moving parts more tenaciously than some of the liquid lubricants.

As suggested, difficulty has frequently been encountered in placing solid greases in desired lubricating positions. Difficulties have occurred also in dispensing such compositions through commercial mechanical dispensing equipment. Many types of grease dispensing equipment are fed by the flow of the lubricant into the pumping mechanism. Where the grease is stiff or fairly solid in consistency, it does not flow sufficiently and the dispensing equipment does not operate satisfactorily. For this reason, it is commonly necessary to apply pressure, for example the pressure of compressed air, to the grease supply to cause it to feed into the dispensing pump. Containers and apparatus for pressurizing are expensive and complex in structure and it is desirable to avoid their use as far as practicable. Also, if the grease cavitates or fails to feed, the dispensing pump picks up a mixture of air and grease resulting in considerable aeration with consequent deficiency in supply or quality of the lubricant.

In its broad aspects, the present invention contemplates the use of appropriate soaps such as alkali metal soaps, preferably with at least small quantities of salts, low molecular weight carboxylic acids, such as the sodium and/or potassium salts, dispersed in mineral oil of lubricating grade. Preferably the grease consists essentially of mineral lubricating oil containing approximately normal grease forming proportions of the sodium, potassium, or mixed sodium and potassium soaps and salts of a mixture of low and high molecular weight carboxylic acids, saturated and/or unsaturated. In general, the low molecular weight fatty acids preferred will consist of those having 2 to 4 carbon atoms. These may be saturated or unsaturated, the unsaturated acids such as acrylic acid apparently being somewhat preferable. The higher fatty acids may comprise those having 12 to 22 carbon atoms, those from 14 to 22 or 16 to 22 carbon atoms being generally preferred. The quantity of soaps employed may be varied somewhat, but in general will be not less than about 8% and not more than 30% by weight, based on the total composition. The mineral oil employed should be of appropriate lubricating grade, preferably having a viscosity of not less than 40 nor more than 200 at 210° F. The corresponding viscosity at 100° F. may be from about 100 to 4,000 or more.

It is desirable, though not entirely essential, to employ an antioxidant, such as phenyl alpha naphthylamine. The antioxidant may be used in appropriate percentages, a quantity of from 1 to 2% being normally satisfactory. Other additives, such as extreme pressure compounds, oiliness agents, viscosity index improvers, tackiness agents, rust inhibitors, and the like, may be employed in appropriate quantities as will be obvious to those skilled in the art.

While the exact phenomena involved in the invention are not fully understood, it appears that a fairly stable supersaturated solution of soap in oil is obtained by finely dispersing the soap and salts. This composition remains quite fluid until the composition is subjected to mechanical working. The invention, therefore, includes not only the composition but an improved process of preparing and using greases of the character referred to above, the process comprising in general the formation of a soap in situ and its dispersion in oil at high temperatures, cooling being accomplished preferably with continuous mixing during at least the first part of the cooling operation. The addition of the lower acids prior to saponification so that they are included in the soap structure appears also to be desirable in the process.

In practicing the invention, it is desirable to use soaps which have a tendency to form soft greases. The alkali soaps and especially the sodium soaps, in general, are quite satisfactory. The potassium soaps form very soft semi-liquid greases and may be used as a part but preferably not all of the thickener.

The salts of the lower acids, acrylic acid for example, may be used in various proportions, preferably in proportions of one-half to one mol, compared with the soap of higher acids. These tend to increase the hardness or "yield" of the grease. If larger quantities, such as one mol or more are employed, the higher soap preferably comprises some potassium soap to offset the increase in hardness. Thus, with one-half mol of lower fatty acid salts (2 to 4 carbon atoms) a sodium soap of the higher fatty acids is quite satisfactory. If the molar proportions of lower and higher soaps are 1:1, the soap of higher molecular weight preferably includes some potassium soap.

In general, the lower and higher fatty acids may be saponified simultaneously after adding them to mineral oil. The saponifying agent may be sodium hydroxide, potassium hydroxide, or a mixture of the two. Other saponifying agents may be used, at least in part, but best results are obtained with NaOH and KOH, apparently because they act more readily to form a supersaturated solution.

The higher fatty materials to be saponified are preferably the partially hydrogenated fatty acids, especially those which are quite highly unsaturated. The grease compositions of this invention may be prepared by conventional methods of mixing, heating and cooling. Thus, the partially hydrogenated fatty acids of 12 to 22 carbon atoms, preferably 14 to 22 carbon atoms, are added to part of the mineral oil of appropriate lubricating grade. The lower acids are added also, and after heating to a temperature sufficient to dissolve the higher fatty materials, the saponifying material is added. Thus the lower and higher acids are neutralized simultaneously in situ. If desired, however, the lower acid or acids may be neutralized and converted to the appropriate salt, preferably alkali metal salt, e. g. of potassium or sodium or a mixture thereof.

The addition of lower fatty acid salts to greases to harden them or increase their temperature resistance has been previously suggested and, per se, forms no part of the present invention.

The invention will be more fully understood upon consideration of the following examples. It will be noted that the desired product may be obtained by various processes and by the use of various combinations of ingredients. In the first example approximately half-molar proportions of lower acid (acrylic) were used with the higher and substantially saturated acids. In the second example, the molar proportions were about 1:1, acetic acid being used in lieu of acrylic. KOH was used along with NaOH as a neutralizer. If NaOH were used alone, the grease would not have been liquid, even prior to working. In the third example, a fatty acid of low saturation was saponified in a low cold test lubricating oil. In each case a liquid composition resulted which solidified on working.

Example I

| | Per cent |
|---|---|
| Hydrogenated fatty acids from fish oil acids of molecular weight of $C_{16}$ and above (substantially saturated iodine No. about 4 or 5) | 10 |
| Acrylic acid | 1 |
| Sodium hydroxide | 2.5 |
| Phenyl alpha naphthylamine | 0.5 |
| Mineral oil of 500 sec./100° F. S. S. U. viscosity obtained from selected Low Cold Test crudes | 86.0 |

The hydrogenated fatty acids and one-third of the mineral oil were first charged to a fire-heated grease kettle and warmed to a temperature of about 150° F. The acrylic acid was then added and the mixture was stirred and the caustic, in aqueous solution, was next added with continued stirring. The temperature was then raised to 210° to 220° F. and the resulting heavy soap mass was dried, all water being substantially evaporated. The remainder of the mineral oil was then added in small portions while heating continued. The temperature was gradually raised to a minimum of 500° F. and held at that high temperature until foaming had subsided and the soap had melted and become completely dispersed or dissolved in the mineral oil. Thereafter heating was discontinued and the grease was cooled in the kettle to a temperature of 200° F., stirring being continued during the cooling process. Upon reaching the temperature of 200° F. stirring was discontinued and the composition was thereafter allowed to cool without stirring to substantially ambient atmospheric temperature. The resulting grease was a smooth homogenous fluid or semi-fluid mass which could readily be poured into containers.

Example II

| | Per cent |
|---|---|
| Hydrogenated fatty acids from fish oil acids of molecular weight of $C_{16}$ and above (substantially saturated) | 20.0 |
| Sodium hydroxide | 3.5 |
| Glacial acetic acid | 4.0 |
| Potassium hydroxide | 3.75 |
| Phenyl alpha naphthylamine | 1.00 |
| Mineral oil of 500 sec./100° F. S. S. U. viscosity obtained from selected Low Cold Test crudes | 67.75 |

The same procedure was used in preparing this composition as in Example I. The resulting grease was a semi-fluid mass which could readily be poured into containers. It will be noted that the soap content was much higher than that of Example I.

The method of heating to a very high temperature to secure complete dispersion appears to be of value in preparing the liquid or semi-liquid grease composition. The use of low molecular weight acids, however, appears to be essential if the substantially saturated higher fatty acids are used. By using highly unsaturated higher fatty acids, the lower acid may be reduced or even eliminated.

Another batch of grease was prepared omitting low molecular weight acid altogether, according to the following example:

*Example III*

| | Per cent |
|---|---|
| Partially hydrogenated fish oil acids (Iodine No. 100) | 20.0 |
| Sodium hydroxide | 4.5 |
| Phenyl alpha naphthylamine | 1.0 |
| Mineral oil of 500 sec./100° F. S. S. U. viscosity obtained from selected Low Cold Test crudes | 74.5 |

The grease of Example III was prepared in the same general manner as Examples I and II. The fatty acids and about one-third of the mineral oil were first combined and warmed, the caustic was then added and the temperature raised to form the soap and drive out the moisture. Thereafter the remainder of the oil was added in small portions while the temperature was raised to at least 500° F. This high temperature was maintained until foaming had subsided and the soap had melted and become completely dispersed in the oil. Thereafter the grease was cooled with stirring to about 200° F. where stirring was discontinued and the mixture allowed to cool to ambient atmospheric temperatures.

The three compositions prepared according to the above examples were tested for worked penetration and dropping point according to the standard A. S. T. M. test procedure. The results of such tests are indicated in the table.

*Table*

| Physical Tests | Appearance | Worked mm./10 Penetration 77° F. | Dropping Point, °F. |
|---|---|---|---|
| Example I | Heavy fluid grease similar to a heavy bright stock. | 350 | 432 |
| Example II | Heavy smooth fluid grease | 400 | 400 |
| Example III | Semi-fluid grease of penetration of 430 mm./10. | 250 | 500+ |

From the above data it will be noted that the products of Examples I and II are fluid lubricants until high shearing stresses are applied to them. The shearing stress imparted by working 60 strokes in the A. S. T. M. grease churn was only sufficient to thicken them to a semi-fluid consistency. Upon the application of the high shearing stress such as that which would occur in a roller bearing, the greases of Examples I and II thickened to solid grease consistency having penetrations of not more than 300 when tested by the standard A. S. T. M. penetrometer. The grease of Example II was subjected to high shearing in a colloid mill and it thickened to a penetration of 285 mm./10. The product of Example III which was a semi-fluid grease upon cooling, thickened substantially upon working to a penetration number of 250 mm./10. This appeared to be the maximum thickening that could be obtained. Apparently a small amount of lower acid would have increased penetration resistance considerably. Upon further working of the grease of Example III, using the standard A. S. T. M. grease worker, modified by using a worker plate containing 300 1/16" holes, grease showed no breakdown after 100,000 strokes, but there was not any additional thickening.

The samples of liquid greases taken from each of the three examples recited above were passed through a standard automobile chassis grease gun under high pressure. On emerging from the gun, each of them had acquired a solid grease structure. The grease of Example I acquired a penetration number of 275 (mm./10), that of Example II was 300, and that of Example III was 250.

It will be noted that the soap content of the first example was considerably lower than that of Examples II and III. Nevertheless it had a firmer consistency than either of the others. The improvement in consistency appears to be due in part to the use of sodium soap of a saturated fatty material and in part to the use of acrylic acid. The latter appears to be somewhat superior to acetic acid in this connection.

In lieu of acetic or acrylic acids, the related saturated or unsaturated acids of 2 to 4 carbon atoms may be used. Thus propionic, butyric, crotonic or methacrylic acids may be employed. Such acids, and especially acrylic or acetic acid, form salts with the saponifying agent which contribute to the desired qualities of fluidity at normal temperature with solidification upon working.

Obviously the amount of lower acid may be varied, depending upon the other ingredients chosen. As in Example III, none may be required where the higher fatty acid is sufficiently unsaturated and is saponified with an alkali that produces a supersaturated soap solution in oil. Where the soap is very soft, a relatively large amount of lower acid, 1:1 or more molar proportions, based on the higher acid, may be used. For harder soaps, the quantity of lower acid should have an intermediate value. These acids are of course converted to salts upon saponification, if not prior thereto.

It appears that by the use of the salts of the lower acid or acids, the dispersion of the higher soap or soaps in oil tends to become more complete. A fine dispersion appears to increase the degree of supersaturation which may be obtained.

Assuming that the phenomenon is properly described as supersaturation, it is obviously desirable that such supersaturation be sufficiently stable that the liquid or semi-liquid composition will not solidify until subjected to a definite and predetermined degree of shear or working. The degree of stability obviously may be controlled by adjusting the proportions of lower acid (or salts thereof), by the choice of higher soap or ingredients thereof, and, to some extent, by the choice of the lubricating oil. The latter, as previously indicated, is preferably of ordinary lubricating grade, although its specifications may vary somewhat. It may contain various conventional addities such as viscosity index improvers, pour point depressors, stringiness agents, tackiness agents, corrosion inhibitors, oxidation inhibitors, and the like. Oxidation inhibitors such as phenyl alpha naphthylamine, phenyl beta naphthylamine, and the like are specifically preferred.

Extreme pressure compounds may be included, as well as other materials such as oiliness agents, as will be understood by those skilled in the art.

The proportions of all the ingredients may be varied, but in general the combined soaps and salts will comprise from about 8 to about 35% of the weight of the total composition. The soap content will ordinarily range from 8 to 30% and the salt content from 0 to about 5 or 6%. When mixed soaps and salts are used, e. g. sodium and potassium, the proportions of these alkali metal components may vary but ordinarily the sodium component should predominate.

Thus a grease made according to this invention has the following characteristics. It may be poured like a liquid lubricant into gears, bearings, housings, etc., so as to fill them completely and so as to contact intimately all the parts to be lubricated. Thereafter upon movement of the parts sufficient to set up a moderately high shearing stress, the liquid solidifies and remains in place as a normal effective plastic solid or semi-solid grease. When it is desired to dispense a lubricating grease, in solid form, from conventional and simple dispensing equipment without resorting to pressure feeding, the normally liquid product of the present invention is readily fed by gravity into the pump mechanism of the dispenser. It flows freely to the pump mechanism. Upon operating the pump or other dispensing mechanism, however, the shear stresses which are set up serve to gel or coagulate the grease so that as it emerges from the dispenser it has assumed its intended solid grease-like consistency.

What is claimed is:

1. The process of preparing a lubricating composition which is liquid until subjected to mechanical stress and which solidifies upon the application of mechanical stress which comprises preparing in mineral oil a soap of higher and lower fatty acids by mixing a molar proportion of the $C_{12}$ to $C_{22}$ higher fatty acids, at least a half molar proportion of the low fatty acids, having 2 to 4 carbon atoms, and alkali metal hydroxide saponifying agent, heating said mixture with continued stirring to a temperature of at least 450° F. to obtain a fine dispersion of said soap in said mineral oil, cooling with stirring to a temperature of the order of 200 to 250° F. and thereafter permitting the composition to cool without further working.

2. A lubricating composition which is normally relatively liquid and mobile and which has the property of setting up to a solid grease consistency upon being subjected to mechanical working, said composition consisting essentially of a mineral lubricating oil containing grease-forming proportions of a soap-salt thickener prepared by mixing about one molar proportion of fatty acid of the $C_{12}$ to $C_{22}$ range, at least one-half molar proportion of $C_2$ to $C_4$ fatty acid, and an alkali metal hydroxide into said oil, heating said mixture with continued stirring to a temperature of at least 450° F. to obtain a fine dispersion of said soap-salt in said oil, cooling with stirring to a temperature range of about 200° to 250° F., and thereafter permitting the composition to cool without further working.

ARNOLD J. MORWAY.

REFERENCES CITED

The following references are of record in the file of this patent:

UNITED STATES PATENTS

| Number | Name | Date |
| --- | --- | --- |
| 1,989,196 | Hilliker | Jan. 29, 1935 |
| 1,995,371 | Werder | Mar. 26, 1935 |
| 2,197,263 | Carmichael et al. | Apr. 16, 1940 |
| 2,274,676 | Earle | Mar. 3, 1942 |
| 2,428,123 | Morgan | Sept. 30, 1947 |
| 2,455,892 | Fraser | Dec. 7, 1948 |
| 2,468,099 | Morway | Apr. 26, 1949 |

OTHER REFERENCES

"The Role of Lithium Stearate in Greases and Waxes," by Meyer, Foote Prints, vol. 16, No. 1, page 4, year 1944.